United States Patent [19]

Tanioka

[11] Patent Number: 4,729,035
[45] Date of Patent: Mar. 1, 1988

[54] IMAGE PROCESSING APPARATUS CAPABLE OF APPRIOPRIATELY ENCODING AND PROCESSING ENTERED IMAGE SIGNALS IN ACCORDANCE WITH THE IMAGE CONTENT

[75] Inventor: Hiroshi Tanioka, Tokyo, Japan

[73] Assignee: Canon Kabushiki Kaisha, Tokyo, Japan

[21] Appl. No.: 612,699

[22] Filed: May 21, 1984

[30] Foreign Application Priority Data

Jun. 1, 1983 [JP] Japan .................. 58-97169

[51] Int. Cl.⁴ .............................. H04N 1/40
[52] U.S. Cl. .................. 358/282; 358/280; 358/283; 358/294
[58] Field of Search .......... 358/260, 262, 280, 282, 358/285, 288, 294, 284, 283

[56] References Cited

U.S. PATENT DOCUMENTS

| | | | |
|---|---|---|---|
| 3,159,815 | 12/1964 | Groce | 358/282 |
| 3,538,246 | 11/1970 | Macovski et al. | 358/262 |
| 3,895,184 | 7/1975 | Komura et al. | 358/260 |
| 4,194,221 | 3/1980 | Stoffel | 358/283 |
| 4,208,677 | 6/1980 | Schayes et al. | 358/280 |
| 4,353,695 | 10/1982 | Tatematsu | 358/260 |
| 4,399,468 | 8/1983 | Mizuno | 358/280 |
| 4,409,623 | 10/1983 | Kobayashi et al. | 358/260 |
| 4,414,581 | 11/1983 | Kato et al. | 358/280 |
| 4,447,829 | 5/1984 | Schayes et al. | 358/260 |
| 4,447,830 | 5/1984 | Stoffel | 358/288 |
| 4,449,150 | 5/1984 | Kato | 358/260 |
| 4,547,811 | 10/1985 | Ochi et al. | 358/280 |

*Primary Examiner*—Howard W. Britton
*Assistant Examiner*—John K. Peng
*Attorney, Agent, or Firm*—Fitzpatrick, Cella, Harper & Scinto

[57] ABSTRACT

An image processing apparatus capable of varying the method of binary encoding and processing in accordance with the content of the image, such as black-and-white image versus an image with intermediate tonal rendition. The image content is identified by detecting the maximum and minimum values of mutually neighboring plural pixels, and comparing the maximum value with a first reference value, the minimum value with a second reference value, and the difference between the maximum and minimum values with a third reference value.

23 Claims, 4 Drawing Figures

IMAGE PROCESSING APPARATUS CAPABLE OF APPROPRIATELY ENCODING AND PROCESSING ENTERED IMAGE SIGNALS IN ACCORDANCE WITH THE IMAGE CONTENT

BACKGROUND OF THE INVENTION

1. Field of the Invention

The present invention relates to an image processing apparatus capable of appropriately binary encoding and processing the entered image signals in accordance with the content of the image.

2. Description of the Prior Art

It has already been proposed to photoelectrically read an original image with an image sensor such as a charge-coupled device or an amorphous silicon sensor, binary encoding the thus produced signals according to a suitable level, and reproducing the original image by means of a binary dot printer such as a laser beam printer or an ink jet printer. It is also proposed to compress thus digitized signals, for example with a modified Huffman encoding circuit, for the purpose of transmission or storage in a magnetic or optical memory.

Binary encoding of the original image can be achieved either through comparison of the signals obtained by reading said original image with a fixed threshold value, or by a so-called dither method in which pixels in a predetermined pixel block, for example of 4×4 pixels, are respectively compared with plural threshold values of different densities and pseudo tonal reproduction is achieved by the number of pixels identified as black or white in said block.

The latter dither method is effective since tonal image reproduction can be achieved with a relatively simple structure. However, the dither method is associated with the drawback of loss of resolving power in the reproduced image. On the other hand, the former binary digitizing method is incapable of tonal reproduction, although the resolving power is sufficiently high.

Consequently, in order to achieve tonal image reproduction while maintaining the resolving power, it is proposed to divide the original image into a tonal reproduction area and a high resolution reproduction area and to manually or automatically switch the method of binary digitizing so as to apply the dither method to the former area and to apply the binary digitizing with a fixed threshold value to the latter area.

In order to identify the content of an image on the original in an automatic and real-time manner, there is already known a method of utilizing the difference between the maximum and minimum image densities in an image area corresponding to the dither matrix used in the dither method, containing plural threshold levels, based on the fact that the change in image density is slow in a tonal image but is steep in a high resolving image. This method is effective as it can be conducted with a relatively simple structure composed of memories of several lines in the main scanning direction, a comparator and a subtracter. The image is identified as a linetone image or a character area if said density difference exceeds a determined value, which is usually an intermediate value between black and white, so that the binary digitizing with a fixed threshold value (hereinafter called binary slicing) is selected. On the other hand, in the case that the density difference does not exceed the determined value, the image is identified as a tonal image such as a photograph, so that the dither method is selected for binary digitizing. Consequently an area which is almost uniformly black or white is identified as a tonal image because of the low density difference and is binary digitized by the dither method.

The image reproduced from such binary digitized image data with a dot printer such as a laser beam printer is not disagreeable since each image block of 4×4 pixels contains only one or two pixels identified as black or white by the dither method.

However, in case of transmission or storage in a page memory after compression encoding, for example with the modified Huffman process, such binary image data results in a very low compression rate, giving rise to a long transmission time or an inefficient image storage with a large memory capacity.

SUMMARY OF THE INVENTION

In consideration of the foregoing, an object of the present invention is to enable secure discrimination of the content of image to be processed.

Another object of the present invention is to provide an image processing apparatus capable of executing binary digitizing process adapted to the content of the image.

Still another object of the present invention is to provide an image processing apparatus capable of executing binary digitizing of image data suitable for compression of the thus binary digitized image data.

Still another object of the present invention is to provide an image processing apparatus capable of executing binary digitizing according to the destination of the binary digitized image signals.

Still another object of the present invention is to provide an image processing apparatus suitable for storage of image information.

The foregoing and still other objects of the present invention, and the effects thereof, will become fully apparent from the following description.

DETAILED DESCRIPTION OF THE PREFERRED EMBODIMENTS

Now the present invention will be clarified in detail by reference to the embodiments thereof shown in the attached drawings.

Figure 1:
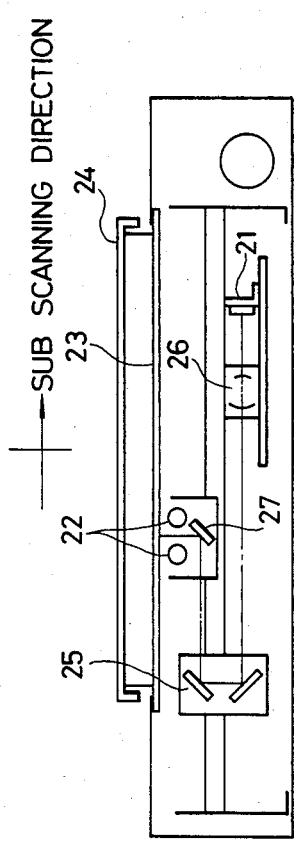
FIG. 1 is a schematic view of a reader embodying the present invention.

FIG. 1 shows an original image reading apparatus or a reader embodying the present invention. An original document is placed, with its image bearing face downwards, on an original carriage glass 23 and is positioned at the left rear corner. Said original is pressed against the carriage glass by an original cover 24. The original is illuminated by a fluorescent lamp 22, and an optical path is formed in such a manner that the reflected light is guided, through mirrors 25, 27 and a lens 26, to an image sensor 21, composed of a charge-coupled device having a linear array of plural photoreceptor elements. Said mirrors 25, 27 are moved with a relative speed ratio of 2:1. The above-described optical unit is moved at a constant speed from left to right by means of a DE servo motor, thus achieving subsidiary scanning with a resolving power of 16 lines/mm.

The maximum main scanning width is 257 mm corresponding to the shorter side of a sheet of B4 size, and, in order to achieve a resolving power of 16 pel/mm, the charge-coupled device is required to have $257 \times 16 = 4112$ bits. In the present embodiment, therefore, there is employed a CCD array sensor having photoreceptor elements of ca. 5000 bits.

In the above-described manner the image of the original document placed on the carriage glass 23 is read line by line and is converted into digital image signals representing density in 6 bits. Said image signals are converted into binary signals by a binary encoding circuit, then subjected to signal compression, for example by the modified Huffman process, and transmitted through a communication line to a receiving unit such as a printer.

Figure 2:
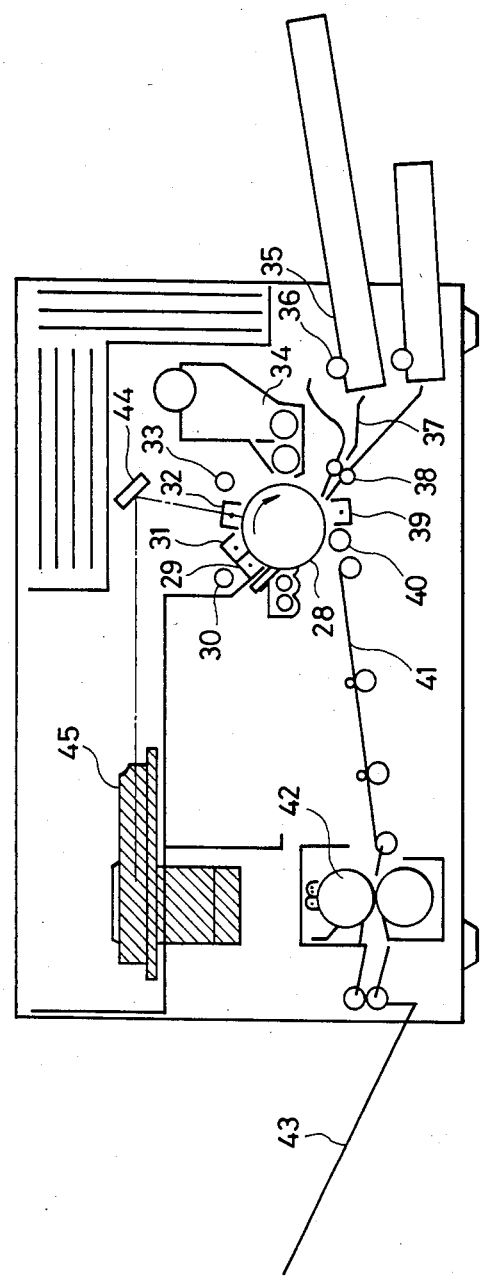
FIG. 2 is a schematic view of a printer for printing operation in response to compressed image signals supplied from the reader.

FIG. 2 shows a printer performing image printing operation in response to the compressed image signals transmitted from the reading unit shown in FIG. 1. The compressed image signals, entered from the communication line, are expanded to binary image signals by an unrepresented expanding circuit. The bit-serial image signals thus expanded are supplied to a laser scanning optical unit 45, composed of a semiconductor laser, a collimating lens, a rotary polygonal mirror, an F-$\theta$ lens and an inclination correcting optical system. The image signals from the reader unit are electro-optically converted in the semiconductor laser, and a laser beam emitted therefrom is converted into a parallel beam in the collimating lens and enters the polygonal mirror rotating at a high speed to scan a photosensitive member 28, thereby forming a latent image thereon.

Said photosensitive member 28 is for example provided with a three-layered structure composed of a conductive layer, a photoconductive layer and an insulating layer, and is associated with suitable process components for image formation, including a preliminary charge eliminator 29, a preliminary charge eliminating lamp 30, a primary charger 31, a secondary charger 32, a whole surface exposure lamp 33, a developing unit 34 for developing the latent image, a sheet cassette 35, a sheet feeding roller 36 for feeding a sheet from the sheet cassette, a sheet guide 37, a registration roller 38, a transfer charger 39 for transferring the image onto the recording sheet, a separating roller 40 for separating the recording sheet from the photosensitive member 28, a transport guide 41, a fixing unit 42, and a tray 43. Thus an image corresponding to the received image signals is formed on the recording sheet.

Figure 3:
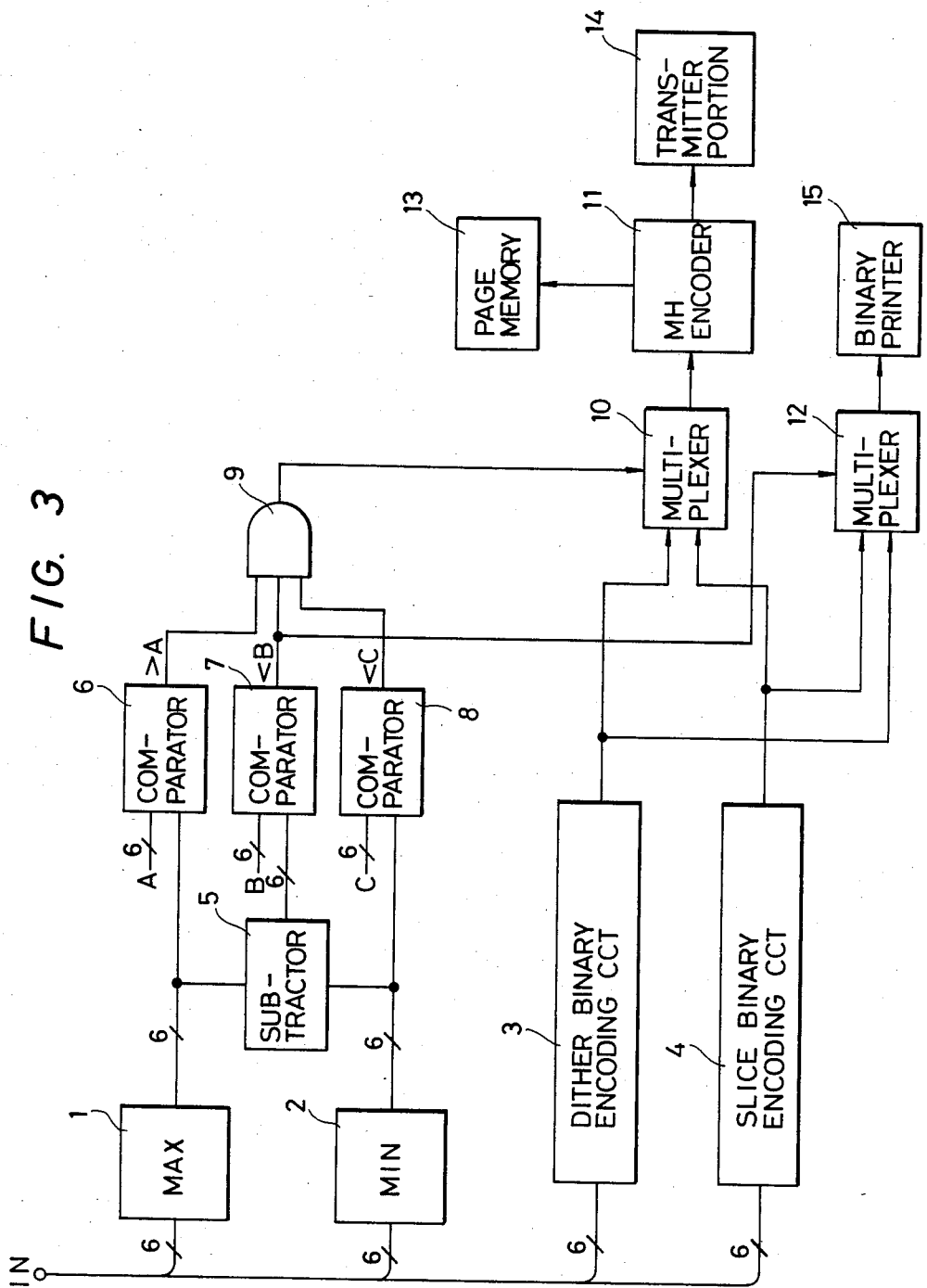
FIG. 3 is a block diagram showing an example of an image signal processing circuit.

FIG. 3 is a block diagram showing an example of an image signal processing circuit provided in the reader unit shown in FIG. 1.

The image signals read from the original by the image sensor 21 are supplied to an input terminal IN after conversion into 6-bit image signals by an unrepresented A/D converter and supplied, in parallel to a miminum detecting block 2, a maximum detecting block 1, a dither binary encoding circuit 3 and a slice binary encoding circuit 4. The maximum detecting block 1 detects the maximum density in an area of $0.5 \times 0.5$ mm composed of $8 \times 8$ pixels and stores, in a memory of 1 K$\times$6 bits, the maximum density detected in each area along the main scanning direction corresponding to the shorter side of B4 size. Similarly the minimum detecting block 2 detects and stores the minimum density (white) in each area. The thus stored values are read simultaneously with the reading of the data of the 9th line of the main scanning.

The density difference is determined by a subtractor 5 calculating the difference of the maximum and minimum values in said blocks 1, 2 and, if said difference is smaller than a determined value B, namely if the density is nearly uniform, a comparator 7 supplies a level-"1" signal to an AND gate 9.

Conventionally the output signal of said comparator is used to select either the dither binary encoding circuit 3 for intermediate toner reproduction or the slice binary encoding circuit 4 for linetone reproduction. In the present embodiment, however, the AND gate 9 releases an output signal "1" by output signals "1" from comparators 6, 8 only when the maximum value is larger than a determined value A and the minimum value is smaller than a determined value C, whereby the binary image data from the dither binary encoding circuit 4 are selected by a multiplexer 10. Thus, a portion of the circuitry of FIG. 3 serves as means to discriminate whether the image represented by the neighboring pixels is an intermediate tone of image, by identifying the difference between maximum and minimum values and identifying whether those values and their difference fall within certain ranges. More specifically, subtractor 5 and comparator 7 identify the difference between the minimum and maximum values and discriminate whether the difference is in a certain range, while comparators 6 and 8 identify whether at least one of the minimum and maximum is within a certain range by comparing those values to suitable reference values C and A, respectively. This portion of the process is completed by AND gate 9, which determines whether or not all three comparators 6–8 give positive outputs.

There are also provided an M-H encoder for encoding the binary image data with the modified Huffman process, a page memory 13, composed for example of a semiconductor or disk memory, for storing one or several pages of the encoded data, and a transmitter unit 14 for serially transmitting the encoded data to a distant printer or the like through a communication line such as a telephone line.

Tab. 1 shows examples of selection of binary encoding methods in the present embodiment and in the prior art.

The image signals entered through the input terminal IN represent density in 6 bits (0–63) wherein white and black are respectively represented by the level 0 and level 63. The aforementioned determined values A, B, C respectively given to the comparators 6, 7, 8 are "6", "32" and "58".

In the case (1) in Tab. 1, where the maximum and minimum values are respectively 50 and 10, the comparator 6 releases an output signal "1" due to a relation $50 > A = 6$ while the comparator 8 releases an output signal "1" due to a relation $10 < C = 58$. However the comparator 7 releases an output signal "0" to provide an output "0" from the AND gate 9, whereby the multiplexer 10 selects the output signals from the slice binary encoding circuit 4.

In the cases (2) and (5) the output signals of the dither binary encoding circuit 3 are selected because of a small density difference and also because the maximum and minimum values are in the range of intermediate tone image.

However, in the cases (3) and (4) for which the dither method is selected in the conventional process because of a small density difference, the slice binary encoding is selected because the maximum and minimum values are both close to the black or white level beyond the value C=58 or A=6. In order to attain better compression, particularly to achieve a higher compression rate, such image in which the density difference is small and the entire density is close to the black or white level should preferably encoded as black or white over the entire area rather than using the dither encoding.

As explained in the foregoing, the present embodiment employs, in the image discrimination, the maximum and minimum densities in addition to the density difference employed in the conventional image discrimination to avoid the dither processing of a black or white image, thereby enabling one to improve the compression rate in the N—H encoding. If the case (3) shown in Tab. 1 is binary encoded with the dither method with 64 threshold values from 0 to 63, there always exist at least three pixels identified as white per unit area of the dither matrix, so that white data are scattered among consecutive black data in the main scanning direction. In the modified Huffman encoding, a line corresponding to B4 size composed entirely of black pixels is represented by codes of 40 to 50 bits, but the quantity of codes increases by about 20 bits if only one white pixel is inserted about the middle. Thus the image discrimination and the method of selecting binary encoding method employed in the present embodiment significantly improves the compression rate in signal compression.

On the other hand, in case the signal compression is not required and the presence of black or white spots is not considered as a major defect, as in the case of a copier, the binary encoding method may be selected solely by the output signal of the comparator 7. In such case there is provided a multiplexer 12 receiving the output signals from the dither binary encoding circuit 3 and the slice binary encoding circuit 4, and is controlled by the output signal of the comparator 7 to select the binary signals for supply to a binary printer 15 such as a laser beam printer.

In the present embodiment either of the two differently binary encoded signals is selected according to the output signal of the AND gate 9, but it is also possible to store a fixed slicing level in a read-only memory which stores the dither pattern to be supplied to the comparator and to select the output signal from said read-only memory by the output signal of the AND gate 9. It is furthermore possible to select, according to the output signal of the AND gate 9, one of the tables stored in a memory providing binary output signals in response to addressing by the image signals. Furthermore such process is applicable not only to the data obtained by reading an original but also to the binary encoding of other data such as those transmitted from a distant location.

Naturally the slicing levels of the comparators are not limited to those employed in the present embodiment.

In the embodiment shown in FIG. 3, the dither process is selected only when the maximum density in the unit area exceeds a determined level and the minimum density in said unit area is lower than a determined level in addition to the condition that the difference between the maximum and minimum densities in said unit area is within a certain range. However, in the signal compression by the modified Huffman method, the codes after signal compression become longer when 1-bit white signals are mixed in with consecutive black signals than when 1-bit black signals are mixed in with consecutive white signals. Consequently it is possible to simplify the dither/binary slicing discriminating circuit shown in FIG. 3 into a form shown in FIG. 4, in order to avoid the presence of white signals scattered in consecutive black signals, which is caused by dither processing of an image with pixels of nearly black density levels and which has a significant effect on the signal compression rate.

Figure 4:
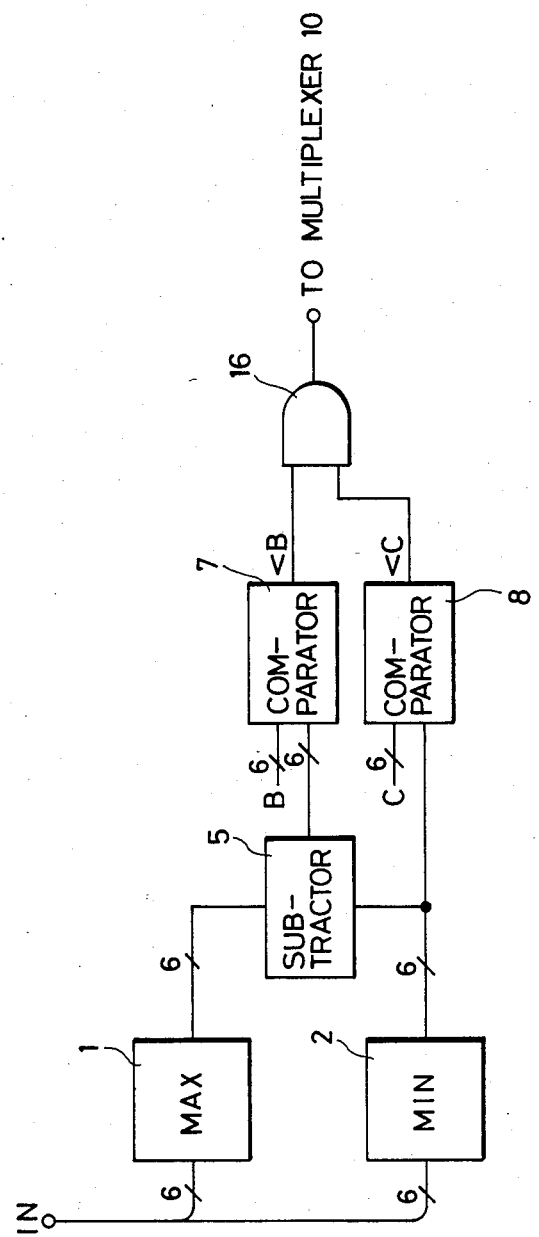
FIG. 4 is a block diagram showing another example of the image signal processing circuit.

In FIG. 4, components having the same functions as those in FIG. 3 are represented by the same numbers. Unlike the circuit shown in FIG. 3, the circuit shown in FIG. 4 lacks the comparator 6 for comparing the output signal form the maximum detecting block with the fixed value A, and is provided with a 2-input AND gate 16 instead of the 3-input AND gate 9 for controlling the function of the multiplexer 10.

In this circuit the nearly black image level, which may cause a significant effect on the signal compression rate as explained before, is binary encoded not by the dither method but by the fixed binary slicing level, while the nearly white image level which has a relatively low effect on the signal compression rate is encoded by the dither method.

Consequently the circuit shown in FIG. 4 allows one to achieve a suitable improvement in the signal compression rate with a simpler circuit structure. Also depending upon the characteristic of the signal compression method, the circuit may be provided with the maximum detecting block instead of the minimum detecting block, contrary to the circuit shown in FIG. 4.

As explained in the foregoing, it is rendered possible to prevent the inconvenience of applying the dither process on an extended black or white area in the original and to attain appropriate binary encoding corresponding to the content of the image. It is particularly effective, in compressing the binary data, for improving the efficiency of compression and reducing the transmission time for example.

TABLE 1

| Case | Max. value | Min. value | Max-Min | Method selected | Method conventionally selected |
|---|---|---|---|---|---|
| (1) | 50 | 10 | 40 | slice | slice |
| (2) | 50 | 40 | 10 | dither | dither |
| (3) | 63 | 60 | 3 | slice | dither |
| (4) | 5 | 1 | 4 | slice | dither |
| (5) | 42 | 40 | 2 | dither | dither |

The present invention is not limited to the foregoing embodiments but is subject to various modificications within the scope of the appended claims.

What I claim is:

1. An image processing apparatus comprising:
input means for entering image signals;
detecting means for detecting the maximum and minimum values of mutually neighboring plural pixels in the entered image signals;
first comparator means for comparing said maximum value with a first reference value;
second comparator means for comparing said minimum value with a second reference value;
third comparator means for detecting the difference between said maximum and minimum values and comparing said difference with a third reference value; and
means for discriminating as to whether or not an image represented by said neighboring plural pixels is an intermediate tone of image in accordance with the results of comparisons of said first, second and third comparator means.

2. An image processing apparatus according to claim 1, further comprising process means capable of applying mutually different image processes to the entered image signals, wherein said process means performs selectively a suitable image process in accordance with the result of discrimination of said discriminating means.

3. An image processing apparatus according to claim 1, wherein said input means comprises read-means for photoelectrically reading an original image.

4. An image processing apparatus according to claim 2, wherein said process means comprises binary encoding means capable of applying different binary encoding processes to the entered image signals, wherein said binary encoding means performs selectively a suitable binary encoding process in accordance with the result of discrimination of said discriminating means.

5. An image processing apparatus according to claim 4, wherein said binary encoding means is adapted to effect a first binary encoding process for intermediate tone reproduction and a second binary encoding process for linetone reproduction.

6. An image processing apparatus according to claim 4, further comprising compression means for compressing image signals which are binary encoded by said binary encoding means.

7. An image processing apparatus comprising:
input means for entering image signals;
first discriminating means for discriminating as to whether or not an image represented by the entered image signals is an intermediate tone of image;
second discriminating means for discriminating as to whether or not the image represented by the image signals is the intermediate tone of image with a method different from that of said first discriminating means; and
binary encoding means capable of applying different binary encoding processes to the entered image signals, said binary encoding means performing selectively a suitable binary encoding process in accordance with the result of discrimination of either said first or said second discriminating means,
wherein said binary encoding means employs the result of discrimination of either discriminating means according to the destination of the binary encoded image signals.

8. An image processing apparatus according to claim 7, wherein said binary encoding means is capable of a first binary encoding process for intermediate tone reproduction and a second binary encoding process for linetone reproduction, and selectively effects either said first or said second process in accordance with the result of discrimination of either said first or said second discriminating means.

9. An image processing apparatus according to claim 7, wherein the image signals binary encoded by said binary encoding means are transmitted to either first processing means for compressing the image signals or second processing means without such compression.

10. An image processing apparatus according to claim 7, wherein said input means comprises reading means for photoelectrically reading an original image.

11. An image processing apparatus according to claim 7, wherein each of said first and second discriminating means is operable to discriminate, on such a division basis that the entered image signals are divided into a plurality of blocks each comprising a predetermined number of image signals, as to whether or not each of the blocks is an intermediate tone of image.

12. An image signal processing apparatus comprising:
input means for entering image signals;
detecting means for detecting the maximum and minimum values of mutually neighboring plural pixels of the entered image signals;
first identifying means for detecting the difference of said maximum and minimum values and identifying whether said difference is within a first determined range;
second identifying means for identifying whether at least one of said maximum and minimum values is within a second determined range; and
discriminating means for discriminating as to whether or not an image represented by said neighboring plural pixels is an intermediate tone of image in accordance with the results of identification of said first and second identifying means.

13. An image signal processing apparatus according to claim 12, further comprising process means capable of applying mutually different image processes to the entered image signals, wherein said process means performs selectively a suitable image process in accordance with the result of discrimination of said discriminating means.

14. An image signal processing apparatus according to claim 12, wherein said input means comprises reading means for photoelectrically reading an original image.

15. An image signal processing apparatus according to claim 13, wherein said process means comprises binary encoding means capable of applying different binary encoding processes to the entered image signals, wherein said binary encoding means performs selectively a suitable binary encoding process in accordance with the result of discrimination of said discriminating means.

16. An image signal processing apparatus according to claim 15, wherein said binary encoding means is adapted to effect a first binary encoding process for intermediate tone reproduction and a second binary encoding process for linetone reproduction.

17. An image signal processing apparatus according to claim 15, further comprising compressing means for compressing the image signals which are binary encoded by said binary encoding means.

18. An image processing apparatus comprising:
input means for entering image signals;
first discriminating means for discriminating as to whether or not an image represented by the entered image signals is an intermediate tone of image;
second discriminating means for discriminating as to whether or not an image represented by the entered image signals is an intermediate tone of image, with a method different from that of said first discriminating means; and
process means capable of applying different image processes to the entered image signals, said process means performing selectively a suitable image process in accordance with the result of discrimination of either said first or said second discriminating means, wherein said process means employs the result of discrimination of either of said discriminating means according to the destination of the processed image signals.

19. An image processing apparatus according to claim 18, wherein said process means comprises binary encoding means capable of applying different binary encoding processes to the entered image signals, and wherein said binary encoding means performs the suitable image process in accordance with the result of discrimination of either said first or said second discriminating means.

20. An image processing apparatus according to claim 19, wherein said binary encoding means is capable of a first binary encoding process for intermediate tone reproduction and a second binary encoding process for linetone reproduction, and selectively effects either said first or said second process in accordance with the result of discrimination of either said first or said second discriminating means.

21. An image processing apparatus according to claim 18, wherein the image signals binary encoded by said binary encoding means are transmitted to either of first processing means for compressing the image signals or second process means without such compression.

22. An image processing apparatus according to claim 18, wherein said input means comprises reading means photoelectrically reading an original image.

23. An image processing apparatus according to claim 18, wherein each of said first and second discriminating means is operable to discriminate, on such a division basis that the entered image signals are divided into a plurality of blocks each comprising a predetermined number of image signals, as to whether or not each of the blocks is an intermediate tone of image.

* * * * *

UNITED STATES PATENT AND TRADEMARK OFFICE
CERTIFICATE OF CORRECTION

PATENT NO. : 4,729,035
DATED : March 1, 1988
INVENTOR(S) : HIROSHI TANIOKA

It is certified that error appears in the above-identified patent and that said Letters Patent is hereby corrected as shown below: On the Title Page

AT [54] IN THE TITLE

"APPRIOPRIATELY" should read --APPROPRIATELY--.

IN THE DRAWINGS

Sheet 2, Fig. 3, "SUB-TRACTOR" should read --SUB-TRACTER--.
Sheet 3, Fig. 4, "SUB-TRACTOR" should read --SUB-TRACTER--.

COLUMN 1

Line 3, "APPRIOPRIATELY" should read --APPROPRIATELY--.

COLUMN 3

Line 59, "converter and supplied," should read --converter, and supplied,--.

COLUMN 4

Line 4, "subtractor" should read --subtracter--.
Line 12, "toner" should read --tone--.
Line 26, "subtractor" should read --subtracter--.

COLUMN 5

Line 8, "preferably encoded" should read --preferably be encoded--.

UNITED STATES PATENT AND TRADEMARK OFFICE
CERTIFICATE OF CORRECTION

PATENT NO. : 4,729,035

DATED : March 1, 1988

INVENTOR(S) : HIROSHI TANIOKA

It is certified that error appears in the above-identified patent and that said Letters Patent is hereby corrected as shown below:

<u>COLUMN 6</u>

Line 14, "form" should read --from--.
    Line 51, "modificications" should read --modifications--.

<u>COLUMN 10</u>

Line 7, "process" should read --processing--.
    Line 11, "means photoelectrically" should read --means for photoelectrically--.

Signed and Sealed this

Ninth Day of August, 1988

*Attest:*

DONALD J. QUIGG

*Attesting Officer*    *Commissioner of Patents and Trademarks*